July 5, 1966  C. M. HELLER  3,259,405
LATERAL OFFSET PIPE EXPANSION JOINT
Filed Aug. 5, 1963
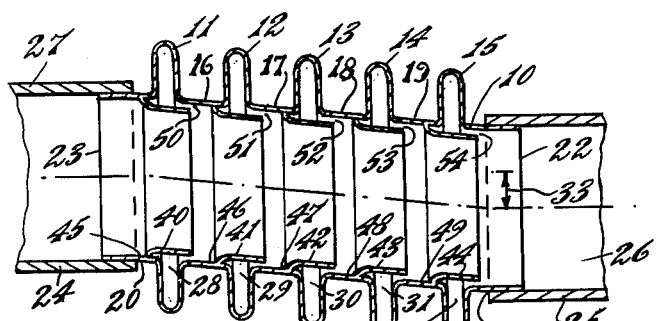
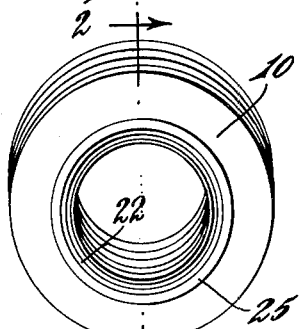
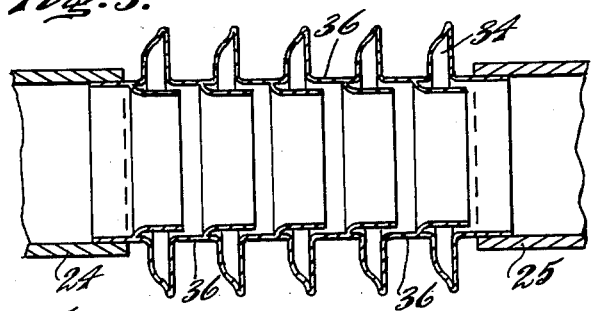
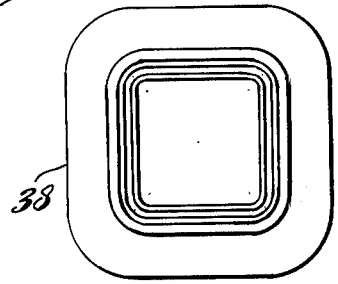
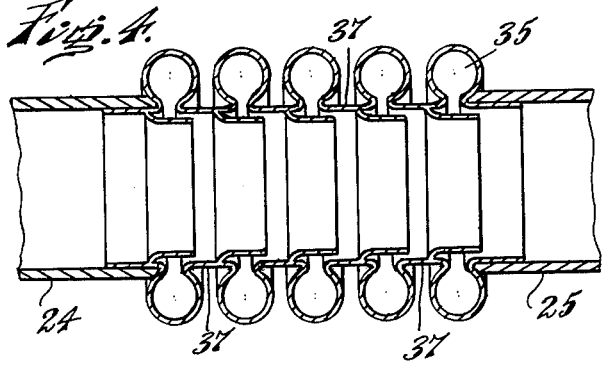
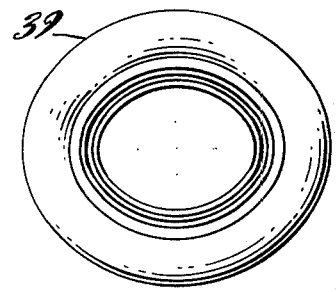
INVENTOR
Chester M. Heller
BY
Karl L. Spivak
ATTORNEY United States Patent Office 3,259,405
Patented July 5, 1966

3,259,405
LATERAL OFFSET PIPE EXPANSION JOINT
Chester M. Heller, 2411 N. 54th St., Philadelphia, Pa.
Filed Aug. 5, 1963, Ser. No. 299,806
1 Claim. (Cl. 285—226)

This invention relates in general to the art of expansion joints and more particularly to packless, corrugated expansion joints primarily designed to compensate for lateral piping offsets under operating conditions.

When a packless, corrugated expansion joint has heretofore been applied between the ends of juxtaposed sections of a piping system which tend to move laterally when in service at maximum operating conditions, it has been customary to use a double-bellows type expansion joint having a central pipe section connected between end bellows elements. The angular cocking of the central pipe section between the two end bellows during the lateral offset displacement of the joint compensated for the deflection in the piping system.

While presently known devices adequately permit deflection to take place, they all suffer from the common deficiency of requiring an overly long expansion joint to reduce stresses. In addition, many applications require an internal sleeve to shield the corrugated elements and these must be constructed of conical configuration in order to permit the lateral offset in the joint to occur without binding on the inside. This diameter reduction occurring in the sleeves results in pressure drop and increased frictional resistance across the joint.

By employing a plurality of corrugations, each separated by a short, straight, tubular section or section of pipe in length usually not exceeding three times the width of adjoining corrugations so as to assume a non-continuous wave configuration, limitations and disadvantages of prior art devices are readily surmounted. The short, straight sections between corrugations, in aggregate, perform the same function as the longer center pipe section in the double bellows type joint now in use. Moreover, the lateral deflection produces a more gradual and smoother transition in the axis of the joint, as opposed to the extremely abrupt change produced in the double bellows type joint.

The instant joint employs short interval, segmented sleeve sections requiring much less clearance between the outside diameter of the corrugations while still permitting the full rated lateral deflection to take place. Since there is no appreciable flow area reduction due to the unusually small clearance required by the segmented sleeves, the usual problems of pressure drop, noise and vibration found in more conventional joints is thus avoided.

It is therefore an object of this invention to provide a corrugated, packless expansion joint employing unique internal sleeve design permitting unrestricted full flow.

It is another object of this invention to provide a corrugated, packless expansion joint designed to compensate lateral piping offsets in a minimum length of joint.

It is another object of this invention to provide a packless corrugated expansion joint providing smooth, gradual transition in the axis of the joint while compensating lateral piping offsets.

Other objects and a fuller understanding of the invention will be had by referring to the following description and claims of a preferred embodiment thereof, taken in conjunction with the accompanying drawing wherein like reference characters refer to similar parts throughout the several views and in which:

FIG. 1 is an end perspective view of the invention in lateral offset position.

FIG. 2 is a longitudinal cross section taken along line 2—2 of FIG. 1.

FIG. 3 is a longitudinal cross section of an expansion joint showing modified corrugation configuration.

FIG. 4 is a longitudinal cross section of an expansion joint showing modified corrugation configuration.

FIG. 5 is an end view of a modification of the invention.

FIG. 6 is an end view of a modification of the invention.

Although specific terms are used in the following description for the sake of clarity, these terms are intended to refer only to the particular structure of my invention selected for illustration in the drawings and are not intended to define or limit the scope of the invention.

As seen in FIGS. 1 and 2, I provide an expansion joint 10 comprising a plurality of lateral, circular, corrugations 11, 12, 13, 14, 15 spaced from each other by short, circular sections 16, 17, 18, 19 at right angles to the general plane of the corrugations. The entire joint may be fabricated by hydraulic, explosive, rolling or similarly resulting methods by forming from a finished tube against corrugation producing dies. The corrugations may also be mechanically press formed in a flat steel sheet and then later welded or otherwise joined into tubular form.

Joint ends 22, 23 may be welded or otherwise secured in fluid and pressure tight connections 20, 21 to adjacent terminals 24, 25 of a piping system 27 thus completing the liquid or gas carrying conduit 26.

Longitudinal relative movement between terminals 24, 25 may be readily compensated by corrugations 11, 12, 13, 14, 15 individually respectively varying base space 28, 29, 30, 31, 32 in the usual manner as required by the overall change in length of the space interval separating terminals 24, 25. The natural spring of the material returns the joint 10 to its original shape upon removal of the stresses in the system 27 causing the longitudinal movement.

A lateral offset 33 between juxtaposed ends 24, 25 of a piping system 27 may likewise be compensated by the same corrugations 11, 12, 13, 14, 15 of joint 10 wherein each individual respective corrugation compensates an equal share of the deflection. In accordance with my design, the corrugations move in parallel planes in the direction of the offset while the circular sections 16, 17, 18, 19 therebetween are angularly respectively cocked to equally share the total displacement between pipe terminals 24, 25. It is thus seen that the displacement stresses are spread throughout the joint 10 and each corrugation absorbs an equal share of the forces. The natural spring of the material returns joint 10 to its original shape upon removal of the stresses in the system 27 causing the lateral offset.

FIGS. 3 and 4 show modifications 34, 35 in corrugation cross sectional design to indicate that the invention is not limited to the more usual bellows type corrugation configuration but that the principles are equally applicable to myriads of varied corrugation cross sections. Circular sections 36, 37 perform in exactly the same manner as sections 16, 17, 18 and 19 in equally cocking to adjust for lateral piping offset 33.

FIGS. 5 and 6 indicate modifications 38, 39 in expansion joint cross sectional design to show that the invention is not limited to circular cross section piping, but is likewise applicable to expansion joints in ducts, pen stocks, steam and gas turbine exhaust connections which may have a cross-sectional form other than circular such as rectangular, triangular, oval, elliptical, etc.

When desirable from a design standpoint, corrugations 11, 12, 13, 14, 15 may be shielded by internal, circular sleeves 40, 41, 42, 43, 44 welded or otherwise secured to circular section interiors 45, 46, 47, 48, 49 upstream from the corrugations. Sleeves extend in the direction of flow a sufficient distance to cover corrugation bases 28, 29, 30, 31, 32 leaving annular clearance spaces 50, 51, 52, 53, 54.

Said clearance spaces are preferably small to reduce friction to flow to a minimum. However, clearance space must be sufficient to permit angular cocking of individual circular sections 16, 17, 18, 19 without binding upon sleeves when compensating lateral piping offsets.

Although I have described my invention with a certain degree of particularity, it is understood that the present disclosure has been made only by way of example and that numerous changes in the details of construction and the combination and arrangement of parts may be resorted to without departing from the spirit and scope of the invention as hereinafter claimed.

What is claimed is:

In a lateral offset pipe expansion joint for use in a piping system, the combination of a plurality of spaced, circular, transverse, resilient metal corrugations,
- each of said corrugations having an initial axially aligned position and
- said corrugations moving to a laterally offset position upon the imposition of a lateral offset load in the system, a plurality of equal cylindrical sections respectively connecting adjacent corrugations at the adjacent bases thereof,
- said sections being axially aligned when the said corrugations are in axially aligned position and
- said sections being angularly turned when the corrugations are in offset position;

yieldable means to equally angularly turn the said sections from the said aligned position upon the imposition of a lateral deflection in the system,
- said yieldable means comprising identical circumferential yieldable joints between the said sections and the said corrugations,
  - the said joints being operable to flex in any offset direction in response to lateral offset deflection forces in the system,
- each of said sections defining an offset angle equivalent to an equal fractional portion of the total system offset angle,
- each of said corrugations absorbing an equal fractional portion of the total system deflection when stressed to the said laterally offset position, and each of the said corrugations traversing in respectively parallel planes, the annular spaces between adjacent corrugations being maintained substantially circumferentially equal when the joint is flexed to an offset position;

and a plurality of internal sleeves respectively shielding the bases of the said corrugations,
- said sleeves being generally cylindrical in configuration and each having a leading edge and a trailing edge,
  - the said leading edge being secured to the interior of each respective cylindrical section near its connection with the adjoining corrugation base,
  - the said trailing edge of each sleeve being axially spaced from the next adjacent leading edge, and
  - the said trailing edge being radially spaced from the next adjacent cylindrical section to define an annular clearance space therebetween,
    - the said clearance space being slightly greater than the equal fractional portion of the total system deflection when the joint is stressed to its maximum laterally offset position,
    - whereby binding between the sleeves and the cylindrical sections is prevented and substantially unrestricted flow is permitted in all operating positions of the said joint.

References Cited by the Examiner

UNITED STATES PATENTS

| | | | |
|---|---|---|---|
| 2,404,447 | 7/1946 | Marancik et al. | 285—227 |
| 2,444,008 | 6/1948 | Fentress | 138—122 |
| 2,822,194 | 2/1958 | Fentress | 285—299 |
| 2,876,801 | 3/1959 | November | 138—121 |
| 2,893,431 | 7/1959 | Bowditch | 92—42 |
| 3,019,820 | 2/1962 | Yowell et al. | 138—121 |
| 3,061,039 | 10/1962 | Peters | 285—228 X |
| 3,135,295 | 6/1964 | Ziebold | 285—226 X |
| 3,169,785 | 2/1965 | Ziebold | 285—226 |

FOREIGN PATENTS

| | | |
|---|---|---|
| 1,226,286 | 2/1960 | France. |
| 349,051 | 2/1922 | Germany. |
| 191,911 | 12/1937 | Switzerland. |

CARL W. TOMLIN, *Primary Examiner.*

THOMAS F. CALLAGHAN, *Examiner.*